United States Patent [19]

Song

[11] Patent Number: 5,142,207
[45] Date of Patent: Aug. 25, 1992

[54] ACCELERATION AND DECELERATION METHOD FOR TRANSFERRING DEVICE

[75] Inventor: Jin I. Song, Inchun, Rep. of Korea

[73] Assignee: SamSung Electronics Co., Ltd., Kyung Ki-Do, Rep. of Korea

[21] Appl. No.: 472,392

[22] Filed: Feb. 1, 1990

[30] Foreign Application Priority Data

May 19, 1989 [KR] Rep. of Korea ............... 1989/6680

[51] Int. Cl.$^5$ ............................................. G05B 11/26
[52] U.S. Cl. ................................ 318/615; 318/616; 318/572; 318/573; 318/603
[58] Field of Search ............................ 318/560–640; 364/513, 169, 174, 180, 167.01

[56] References Cited

U.S. PATENT DOCUMENTS

| | | | |
|---|---|---|---|
| 3,870,939 | 3/1975 | Robert | 318/621 X |
| 4,143,310 | 3/1979 | Fujinawa et al. | 318/603 X |
| 4,287,460 | 9/1981 | Nozawa et al. | 318/571 |
| 4,348,731 | 9/1982 | Kogawa | 364/174 X |
| 4,554,497 | 11/1985 | Nozawa et al. | 318/636 |
| 4,600,985 | 7/1986 | Nozawa et al. | 318/571 X |
| 4,603,286 | 7/1986 | Sakano | 318/572 X |
| 4,611,155 | 9/1986 | Kurakake | 318/603 |
| 4,648,026 | 3/1987 | Petrick | 364/174 |
| 4,652,804 | 3/1987 | Kawamura et al. | 318/573 X |
| 4,706,003 | 11/1987 | Nakashima et al. | 318/636 X |
| 4,728,872 | 3/1988 | Kishi et al. | 318/567 X |
| 4,782,275 | 11/1988 | Sakamoto et al. | 318/571 X |
| 4,815,007 | 3/1989 | Sakai et al. | 364/167.01 X |
| 4,891,568 | 1/1990 | Shibata et al. | 318/603 X |
| 4,912,385 | 3/1990 | Kawamura et al. | 318/603 |

*Primary Examiner*—Paul Ip
*Attorney, Agent, or Firm*—Robert E. Bushnell

[57] ABSTRACT

An acceleration and deceleration method with steps that calculate transferring distance, average transferring speed in the x-direction and y-direction, intermediate destination position at every sampling time and the number of sampling times based on final destination position, initial current position and rectilinearly transferring speed; a step of determining initial position; and steps which calculate position pattern and destination position with linear equations, detect intermediate current position with linear equations, sequentially calculate position deviation and transferring speed per sampling time, so that the next step outputs a driving signal for a servo motor. Therefore, an object is transferred in exponential acceleration and deceleration according to linear equations describing rectilinearly transfer speed, and transferring distance in x-direction and y-direction.

9 Claims, 4 Drawing Sheets

ACCELERATION AND DECELERATION METHOD FOR TRANSFERRING DEVICE

BACKGROUND OF THE INVENTION

1. Field of the Invention

The invention relates to an acceleration and deceleration method, particularly to an acceleration and deceleration method which is suitable for application of the hand of a robot and for an operating portion of a machine tool.

2. Description of Prior Art

The prior machine tool and robot are linearly accelerated and decelerated at the beginning and deceleration of axially transferring, so that the mechanism gets a shock, and has bad linearity and discontinuity of speed while transferring objects.

For example, FIG. 1 is a graph showing relation among speed of transferring objects, speed in the x direction, and in the y direction, and transferring distance.

In FIG. 1, (Xi,Yi) are the coordinates of current position for transferring objects, and (Xf,Yf) are the coordinates of the destination position. If V is the rectilinearly transferring speed of objects from current position to destination position, the x-component $\Delta X$ and y-component $\Delta Y$ of the transfer distance are $$\Delta X = |Xf - Xi| \quad (1)$$

$$\Delta Y = |Yf - Yi| \quad (2)$$

and transferring speed Vx, Vy in the x direction and y direction are:

$$Vx = V * \frac{\Delta X}{\sqrt{\Delta X^2 + \Delta Y^2}} \quad (3)$$

$$Vy = V * \frac{\Delta Y}{\sqrt{\Delta X^2 + \Delta Y^2}} \quad (4)$$

For example, the coordinates of the current position are (Xi,Yi)=(100,100), and the coordinates of the destination position are (Xf,Yf)=(8100, 6100), and the rectilinearly transfer speed of object is V=180 pulse/msec, x-component $\Delta X$, y-component $\Delta Y$ of the transfer distance are:

$$\Delta X = |Xf - Xi| = |8100 - 100| = 8000 \text{ pulse}$$

$$\Delta Y = |Yf - Yi| = |6100 - 100| = 6000 \text{ pulse, and}$$

X-component Vx, Y-component Vy of transfer speed are:

$$Vx = V * \frac{\Delta X}{\sqrt{\Delta X^2 + \Delta Y^2}} = 180 * \frac{8000}{\sqrt{8000^2 + 6000^2}}$$

$$= 144 \text{ pulse/msec}$$

$$Vy = V * \frac{Y}{\sqrt{\Delta X^2 + \Delta Y^2}} = 180 * \frac{6000}{\sqrt{8000^2 + 6000^2}}$$

$$= 108 \text{ pulse/msec.}$$

If the current position (Xi, Yi), the destination position (Xf, Yf) and rectilinearly transfer speed are given, we get x-direction distance X, and y-direction distance Y of transfer distance and x-direction speed Vx, y-direction speed Vy of the transfer speed.

When the transferring mechanism transfers an object with linear acceleration and deceleration while rectilinearly transferring the object such as shown in FIG. 2, area of AB'C'D and area of ABCD in FIG. 2 are the y-direction transferring distance $\Delta Y$ and x-direction transfer distance $\Delta X$, and $$\frac{\Delta Y}{\Delta X}, \frac{Vy}{Vx}$$

must be constant in rectilinearly transference at k. If said ratio is constant, the object is rectilinearly transferred from current position to destination position. Accordingly, the ratio is calculated respectively in accelerating period, in decelerating period and in uniform speed period, so that transferring mechanism decides whether or not the ratio is constant, and also the transfer distance Sx in the x-direction and transfer distance Sy in the y-direction at every sampling time are obtained by calculating the following equations:

i) in case of acceleration.
$Sx = \Sigma 1/2 * a_x * t$
$Sy = \Sigma 1/2 * a_y * t \quad 0 \leq t \leq t_1$ ii) in case of uniform speed.
$Sx = \Sigma Vx * t$
$Sy = \Sigma Vy * t \quad t_1 < t < t_2$ iii) in case of deceleration
$Sx = \Sigma 1/2 * a_x * t$
$Sy = \Sigma 1/2 * a_y * t \quad t_2 < t \leq t_3.$ As described in the process, much time is spent on calculation of the equation, so that sampling time becomes unsuitably long to detect current position of the transfer object, and the degree of linearity of the transferred object is bad. Also discontinuity of speed is generated in B,C and B',C' as shown in FIG. 2, thus rectilinear transference is distorted at the discontinued point of speed.

Also, in Japanese Patent Published NO.SHO 61-245209, in order not to generate shock and concussion to the transferring mechanism at the beginning and deceleration of axis transference, the apparatus described in that document uses a the first algorithm portion in which the transferring components are piled up one on another at each sampling time, the second algorithm portion which takes a weighted average of the transferring components and a stage which sets up repeat parameters of the first and second algorithm portion, to enable control of exponential acceleration and deceleration by outputting values resulting from the second algorithm portion as speed command. Because the apparatus achieves exponential acceleration and deceleration by hardware, and because the circuitry needed to compose that hardware requires a large number of electronic components, the manufacturing process for constructing the process needed to compose said hardware is complicated.

SUMMARY OF THE INVENTION

To solve these problems, the invention relates to a method which rectilinearly transfers an object, exponentially accelerates and decelerates by calculating linear equation of rectilinearly transfer speed, and transfer distance in x-direction and y-direction.

In order to obviate these problems of the prior art, according to the invention, the illustrated embodiment of the invention comprises steps which calculate transfer distance, average transfer speed in x-direction and y-direction, intermediate destination position at every sampling time and the number of sampling times by final destination position, initial current position and rectilinearly transfer speed; step determining initial position; and, steps which calculate position pattern and destination position using linear equations, detect intermediate current position using, and linear equations, sequentially calculate position deviation and transferring speed per sampling time, so that the next step applies a driving signal of serve motor.

BRIEF DESCRIPTION OF THE DRAWINGS

The above and other objects of the invention will be seen by the following description taking connection with the accompanied drawings, in which.

DETAILED DESCRIPTION OF THE PREFERRED EMBODIMENT

The invention will be described in more detail hereinafter with reference to the accompanying drawings in comparison with the prior art.

Figure 1:
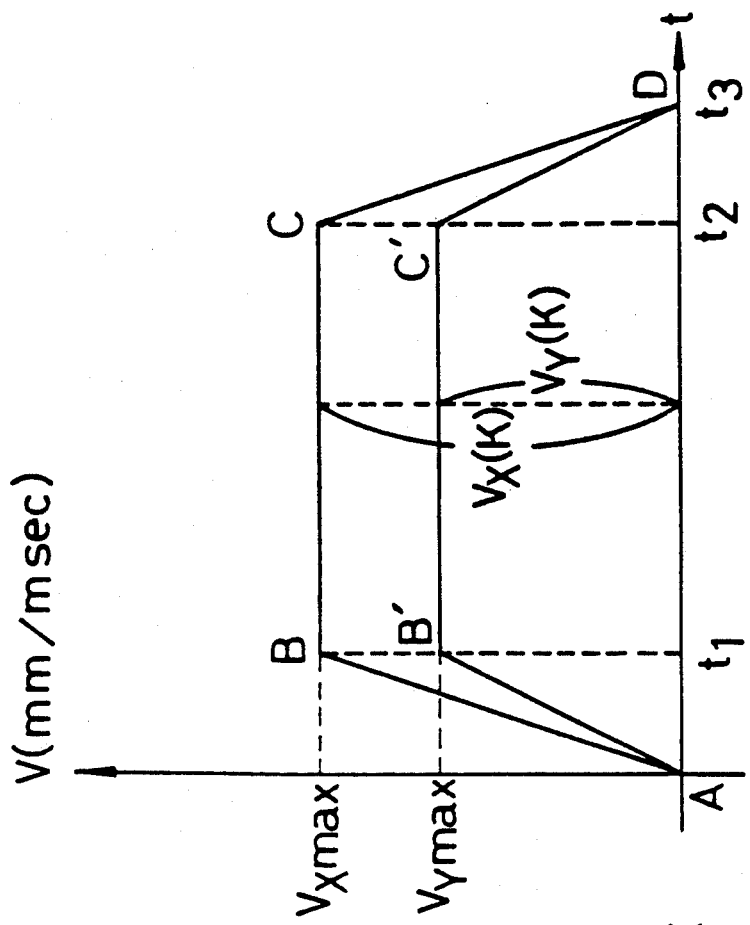
FIG. 1 is a graph showing the relation among rectilinearly transfer speed, x-component and y-component of transferring speed and transferring distance.
Figure 2:
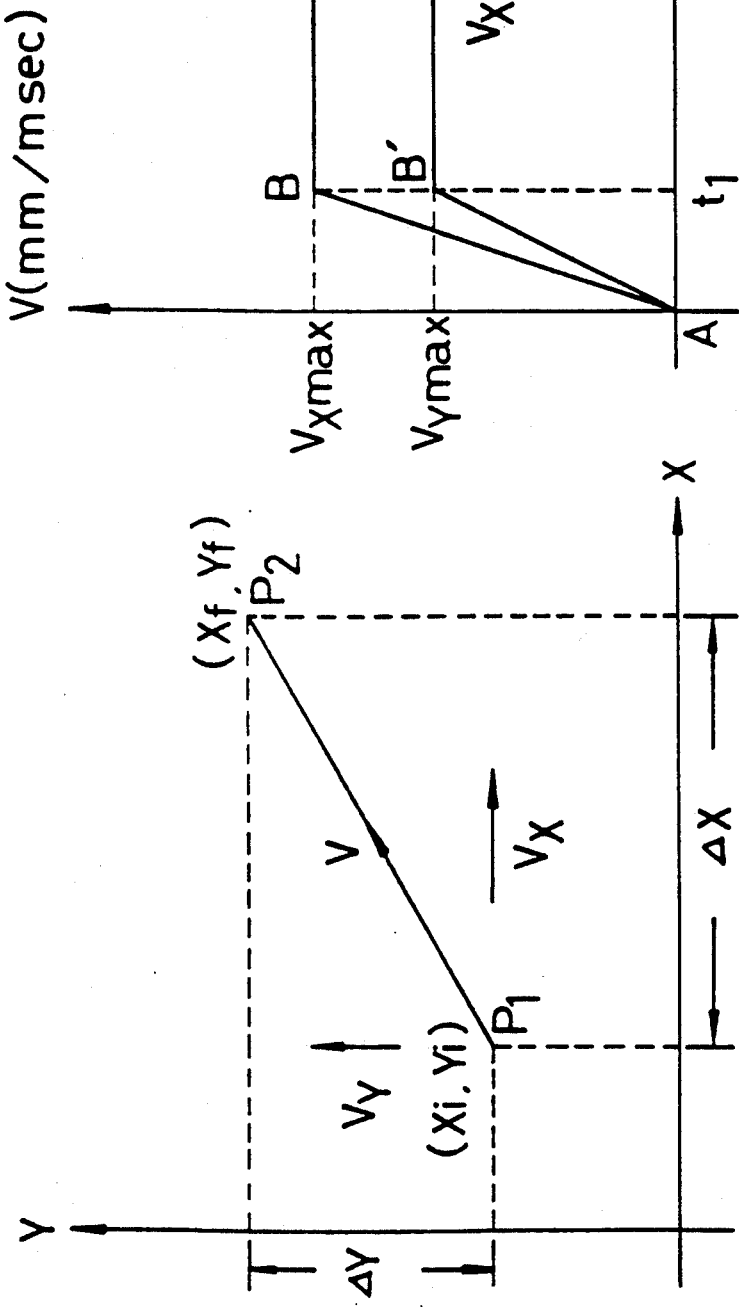
FIG. 2 is a graph showing a pattern of transferring speed in x-direction and y-direction when an object is rectilinearly transferred in linear acceleration and deceleration.

Referring in FIG. 1, if the transfer speed V or an object is 50 pulse/msec, the coordinates of the initial current position of an object is (Xi,Yi)=(100,100) and the coordinates of the final destination position of the object is (Xf,Yf)=(500,400), the transfer distance X, Y in the x-direction and y-direction are:

$$\Delta X = |Xf - Xi| = |500 - 100| = 400 \text{ pulse}$$

$$\Delta Y = |Yf - Yi| = |400 - 100| = 300 \text{ pulse}$$

and the x-component Vx, y-component Vy of the transfer speed are obtained by the following equation (3), (4):

$$Vx = V * \frac{\Delta X}{\sqrt{\Delta X^2 + \Delta Y^2}} = 50 * \frac{400}{\sqrt{400^2 + 300^2}}$$

$$= 40 \text{ pulse/msec}$$

-continued
$$Vy = V * \frac{\Delta Y}{\sqrt{\Delta X^2 + \Delta Y^2}} = 50 * \frac{300}{\sqrt{400^2 + 300^2}}$$

$$= 30 \text{ pulse/msec.}$$

Figure 3:
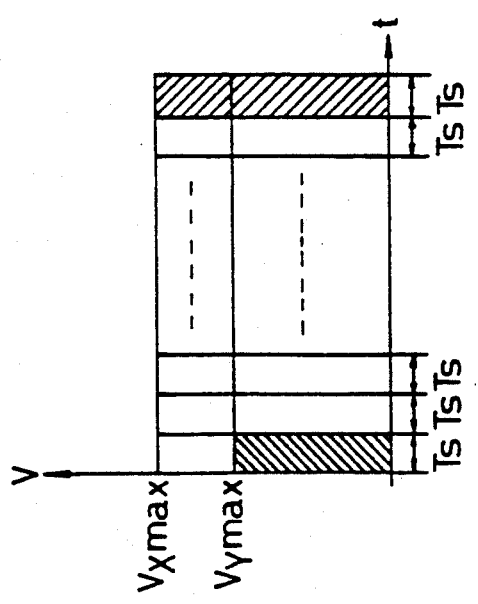
FIG. 3 is a graph showing patter of transfer speed in x-direction and y-direction when object is rectilinearly transferred in at a uniform speed by the method of the invention.

Here, if sampling time Ts is 1 millisecond, the transfer distance of uniform speed in the x-direction and y-direction in every sampling time, that is to say, intermediate destination position in x-direction and y-direction is shown in FIG. 3.

The transfer distance Sx(Ts),Sy(Ts) in x-direction and y-direction at every sampling time are:

$$Sx(Ts) = Vx * Ts \tag{5}$$
$$= 40 \text{ pulse/msec} * 1 \text{ msec} = 40 \text{ pulse}$$

$$Sy(Ts) = Vy * Ts \tag{6}$$
$$= 30 \text{ pulse/msec} \times 1 \text{ msec} = 30 \text{ pulse.}$$

the number of sampling times Nx, Ny are:

$$Nx = \frac{Xf - Xi}{Sx(Ts)}$$
$$= \frac{500 - 100}{40} = 10$$

$$Ny = \frac{Yf - Yi}{Sy(Ts)}$$
$$= \frac{400 - 100}{30} = 10.$$

and Nx=Ny=N. When an object is exponentially accelerated and decelerated, and the x-component Vx, y-component Vy of transfer speed during an accelerating period are:

$$Vx(t) = V\text{xmax}*[1 - \exp(-t/\tau)]$$

$$Vy(t) = V\text{ymax}*[1 - \exp(-t/\tau)].$$

and, in every sampling time Ts, the x-component Vx(Ts), the y-component Vy(Ts) of the transferring speed are:

$$Sx(Ts) = V\text{xmax}*[1 - \exp(-Ts/\tau)]*Ts$$

$$Sy(Ts) = V\text{ymax}*[1 - \exp(-Ts/\tau)]*Ts$$

Also, in a period of deceleration, the x-component Vx(t), and the y-component Vy(t) of the transfer speed are:

$$Vx(t) = V\text{xmax}*\exp(-t/\tau)$$

$$Vy(t) = V\text{ymax}*\exp(-t/\tau).$$

the x-component Vx(Ts), and the y-component Vy(Ts) of transfer speed in every sampling time are:

$$Vx(Ts) = V\text{xmax}*\exp(-Ts/\tau)$$

$$Vy(Ts) = V\text{ymax}*\exp(-Ts/\tau).$$

intermediate destination positions Sx(Ts), Sy(Ts) of the transferred object are:

$$Sx(Ts) = V\text{xmax}*\exp(-Ts/\tau)*Ts$$

$$Sy(Ts) = Vymax * \exp(-Ts/\tau) * Ts, \text{ and}$$

because the equations are calculated, calculating time is long and position control by calculating the equations need much time, position control is unstable and linearity of transference is distorted, therefore the invention does not control the transferring mechanism by exponential acceleration and deceleration, but rather by rectilinearly transferring the object by linear equation such as the following equations (9),(10), instead of direct exponential acceleration and deceleration of transferring mechanism:

$$Vx(k + 1) = Vx(k) + \frac{Vx(Ts) - Vx(k)}{J} \quad (9)$$

$$Vy(k + 1) = Vy(k) + \frac{Vy(Ts) - Vy(k)}{J} \quad (10)$$

where J is a constant for adjusting the slope of the exponential function, and $Vx(0) = Vy(0) = 0$.

Figure 4:
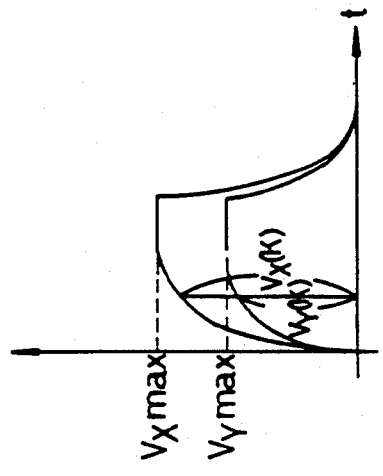
FIG. 4 is a graph showing pattern of transferring speed in x-direction and y-direction when an object is rectilinearly transferred during acceleration and deceleration according to the principles of the invention.

FIG. 4 shows a pattern of the transfer speed in the x-direction and y-direction by equation (5),(6). As shown in FIG. 4, the ratio of x-component to y-component of the transfer speed in constant as $Vy(k)/Vx(k) = \frac{3}{4}$ in time k, so that the object is rectilinearly transferred in the X-Y plane, and, if sampling time is 1 msec, transfer distance Sx(Ts) in the x-direction is 40 pulse, transfer distance Sy(Ts) in the y-direction is 30 pulse, and intermediate destination position from equations (9),(10) is obtained by following equation:

$$Px(k + 1) = Px(k) + \frac{Sx(Ts) - Px(k)}{J} \quad (11)$$
$$= Px(k) + \frac{40 - Px(k)}{J}$$

$$Py(k + 1) = Py(k) + \frac{Sy(Ts) - Py(k)}{J} \quad (12)$$
$$= Py(k) + \frac{30 - Py(k)}{J}.$$

Figure 5:
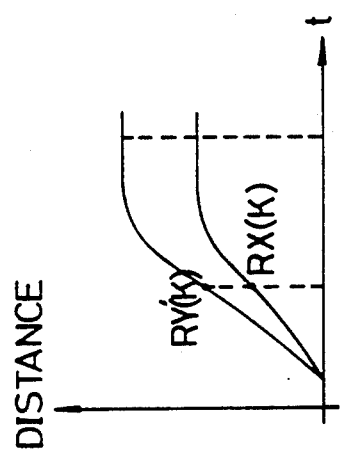
FIG. 5 is a graph showing position inference in the x-direction and y-direction when an object is rectilinearly transferred during exponential acceleration and deceleration by rectilinear transference according to the principles of the invention.

Accordingly, x-component Px'(k), y-component Py'(k) of intermediate destination positions during kth sampling time are:

$$Px'(k) = \sum_{i=0}^{k} Px(i + 1) \quad (13)$$

$$Py'(k) = \sum_{i=0}^{k} Py(i + 1), \text{ and} \quad (14)$$

equations (13),(14) shown graphically in FIG. 5.

Figure 6:
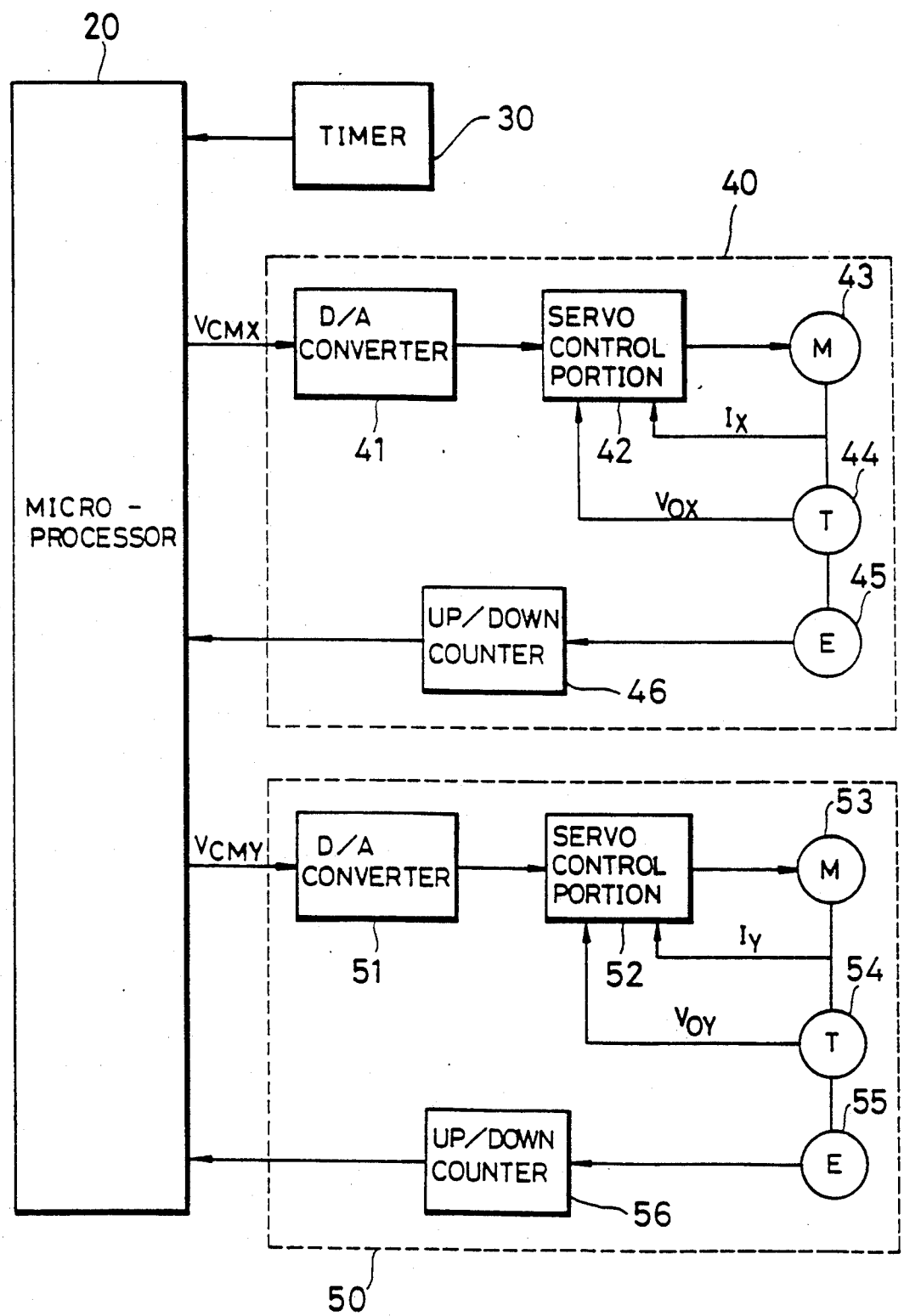
FIG. 6 is a block diagram showing circuitry of an embodiment that uses a rectilinear transfer method according to the principles of the invention and FIG. 7 is a flow chart that explains the rectilinear transference method of the invention.

In the embodiment shown in FIG. 6, FIG. 6 is a block diagram showing the circuitry of the transfer system to which the invention is applied. The illustrated embodiment of the invention in FIG. 6 comprises microprocessor 20 which controls the entire operation of the transfer system, timer 30 which applies a periodically interrupt signal to microprocessor 20, x axis control portion (40) and y axis control portion (50) which transfer x axis transferring stand and y axis transferring stand respectively in the x-direction and y-direction under microprocessor control.

Here, x axis control portion and y axis control portion respectively comprise D/A converter 41,51 which converts driving signals Vcmx,Vcmy from the microprocessor in to analog signals, servo control portion 42,52 which transfers x axis stand y axis stand in the x-direction and y-direction by controlling servo motor 43,53 based on output signals of the D/A converter 41,51, feedback current Ix,Iy and speed feedback signal of servo motor 43,53; tacometer generator which, being attached to servo motor 43,53, detects speed feedback signal Vox,Voy, and encoder 45,55 which detects current position; and up/down counter 46,56 which outputs position detecting signals to microprocessor 20 by up/down counting pulse signals outputting from encoder 45,55.

In the embodiment of the transfer system illustrated in the description, timer 30 periodically applies an interrupt signal to microprocessor 20, and if microprocessor 20 outputs driving signals Vcmx,Vcmy to D/A converters 41,51 based on current position and next destination position, D/A converters 41,51 converts driving signal Vcmx,Vcmy into an analog signal and output driving signals Vcmx,Vcmy to the servo control portion. Here, driving signals Vcmx,Vcmy have been converted into analog signals by D/A converters 41,51 which are the command signals and driving speed signals for driving servo motors 43,53 forward and in reverse directions. At this point current feedback signals Ix,Iy from servo motor 43,53 are fed-back to the servo control portion and further speed feedback signals Vox,Voy which tacometer generator 44,54 detects based on driving speed of servo motor 43,53 are fed-back to servo control portion 42,52 which then respectively controls servo motor 43,53.

Figure 7:
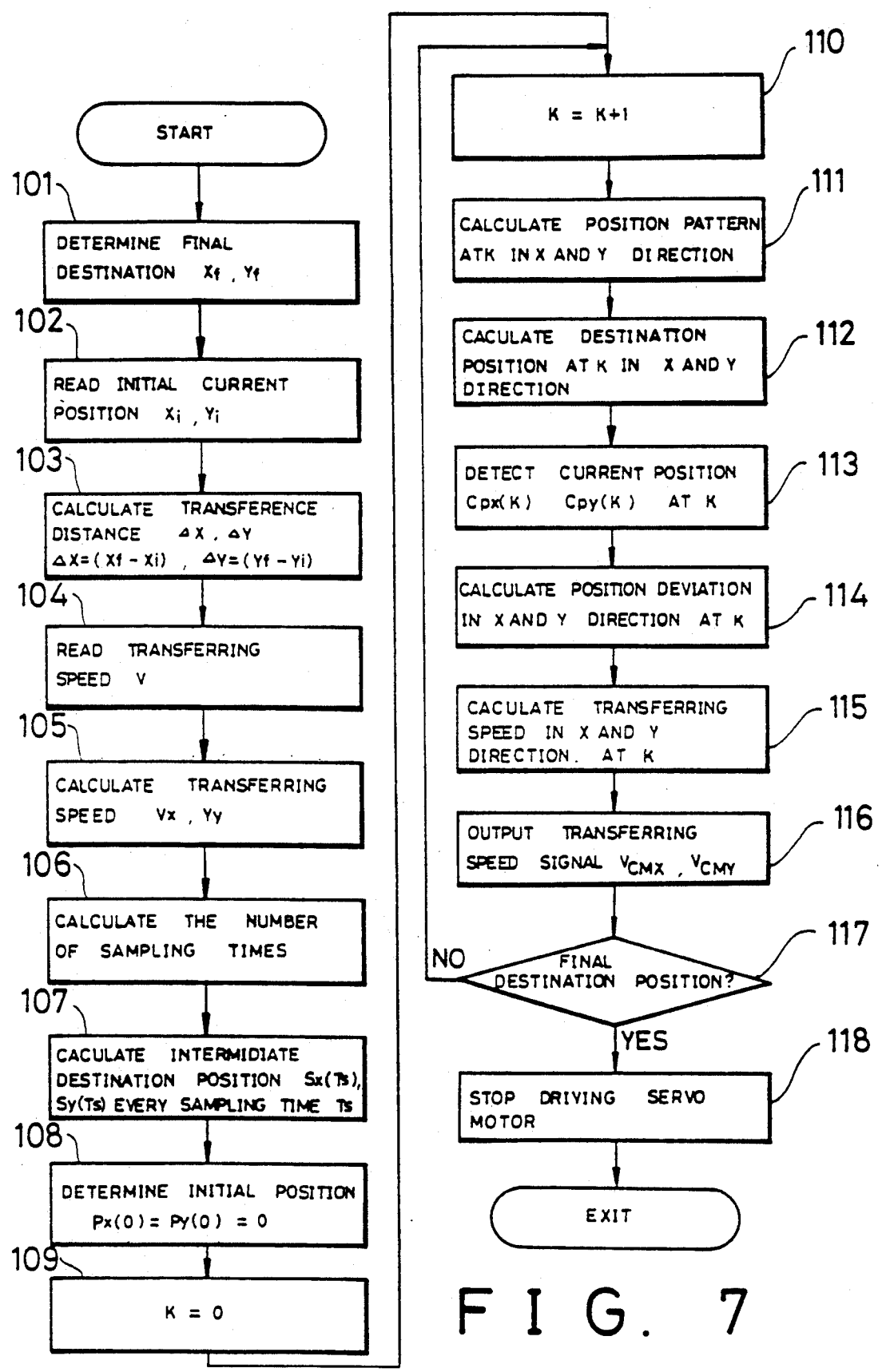

FIG. 7 is a flow chart explanatory of the rectilinear transference method of the invention. In step 101 final destination position Xf,Yf of an object is determined, in step 102 initial current position is read out, in step 103 the transfer distances X, Y in the x-direction and y-direction are calculated by equations (1), (2) and absolute values are obtained, in step 104 microprocessor 20 reads the transfer speed V in which the object is rectilinear transferred from initial current position (Xi, Yi) to final destination position (Xf,Yf), in step 105 transfer, and speed Vx,Vy the in x-direction and y-direction is calculated by equation (3),(4), in step 106 the number of sampling times N is calculated by equations (7),(8), in step 107 intermediate destination positions Sx(Ts), Sy(Ts) transferred at each sampling time Ts, in step 108 initial positions Px(0)=0 in the x-direction and Py(0)=0 in y-direction are determined, and in step 109 variable k is 0. In this process, after the transfer distance X, Y, the transfer speed Vx, Vy, are intermediate destination positions Sx(Ts),Sy(Ts) are calculated, in step 110 variable k is increased by 1, in step 111 position patterns Px(k+1) in the x-direction and y-direction at k are calculated by equations (11),(12), in step 112 intermediate destination positions Px'(k),Py'(k) in the x-direction and y-direction at k are calculated by equations (13),(14), in step 113 intermediate current positions Cpx(k), Cpy(k) in the x-direction and y-direction at k are detected by counts of signal of up/down counter 46,56, in step 114 position deviations Epx(k), Epy(k) in x-direction and y-direction at k are calculated by the following equations:

$$Epx(k) = Px'(k) - Cpx(k) \quad (15)$$

$$Epy(k) = Py'(k) - Cpy(k) \quad (16).$$

In step 115 the transfer speeds Vcmx, Vcmy in the x-direction and y-directions at k are calculated by the following equations:

$$Vcmx = Epx(k)*Kpx \quad (17)$$

$$Vcmy = Epy(k)*Kpy \quad (18)$$

In step 116 the servo motors are driven by applying transfer speeds Vcmx,Vcmy to D/A converters 41,51, so that an object is transferred by transferring stand, in step 117 it is decided whether or not the object is transferred to final destination position (Xf,Yf). When the object is not transferred to final destination position (Xf,Yf), the process returns to step 110 and repeats the process from step 110 to step 117, and if the object is transferred to the final destination position, the control means stops driving the servo motors and the transfer process stops.

As in the foregoing description, an object is rectilinearly transferred by exponentially accelerating and decelerating the object using linear equations without calculating exponential functions, therefore the invention has the advantage that calculation time is short, degree of linearity of transferring distance is improved and transfer speed is not discontinued.

What is claimed is:

1. A method for controlling X and Y axis servo motors to transfer an object rectilinearly from an initial position to a final destination comprising the steps of:

calculating each distance of X and Y directions from the initial position to the final destination which the object is moved;

calculating the distances of the object moved in X and Y directions and obtaining the transferring speeds from the proportion of the vector sum corresponding to the calculated distance to distances, which are assumed to be moved at previous stored average transferring speeds in each direction;

calculating the proportions of the moved distances to the transferring distances sampling time in X and Y directions to obtain a number of sampling time periods N;

obtaining the transferring distances Sx(Ts) and Sy(Ts) in X and Y directions at the previous stored transferring speed during each of said sampling time periods N;

inserting the transferring distances Sx(Ts) and Sy(Ts) into position pattern equations with the increasing of k from 0 by 1 to obtain the position patterns every sampling time period in X and Y axes, wherein, the position pattern equation are as follows:

$$Px(k + 1) = Px(k) + \frac{Sx(Ts) - Px(k)}{J}$$

$$Py(k + 1) = Py(k) + \frac{Sy(Ts) - Py(k)}{J}$$

where:
Px(0) = Py(0) = 0, and
k = an integer, accumulating values of the equations Px(k) and Py(k) corresponding to the arbitrary time k to obtain the total transferring distances of Px'(k) and Py'(k), wherein, the transferring distances Px'(k) and Py'(k) are as follows, $$Px'(k) = \sum_{i=0}^{k} Px(i)$$

$$Py'(k) = \sum_{i=0}^{k} Py(i)$$

obtaining differences Epx(k) and Epy(k) of the transferred distances Px'(k) and Py'(k) at the arbitrary time k from current positions Cpx(k) and Cpy(k);

multiplying the differences Epx(k) and Epy(k) by arbitrary coefficients Kpx and Kpy to output the results as digital transferring speed command signals Vcmx and Vcmy;

converting said digital transferring speed command signals Vcmx and Vcmy to respective analog speed command signals for operably controlling said X and Y axis servo motors to transfer said object to said final destination;

determining whether or not the object has reached the final destination;

performing again from the step of inserting the transferring distances Sx(Ts) and Sy(Ts) into position pattern equations with the increasing of k from 0 by 1 to obtain the position patterns every sampling times in X and y axes if said object has not reached the final destination as determined from said step of determining; and, stopping the X and Y axis servo motors if said object has reached the final destination as determined by said step of determining.

2. The method of claim 1, wherein said position pattern, said destination position, said intermediate current position, said position deviation and said transferring speed are calculated by a microcomputer using a predetermined linear equation.

3. A method for controlling X and Y axis servo motors to transfer an object rectilinearly from an initial position to a final destination comprising the steps of:

determining a final destination to where said object is to be moved;

reading an initial current position of said object to be moved;

calculating a transference distance using said final destination and said initial current position;

reading a transferring speed at which said object is to be moved;

calculating a x-component of said transferring speed and a y-component of said transferring speed;

calculating a number of intermediate sampling times for use in determining intermediate destination positions said object is to be moved;

calculating said intermediate destination positions for every intermediate sampling time;

setting initial x and y position data equal to zero;

calculating position patterns in a x-direction and a y-direction;

calculating x-component positions and y-component positions from said x-direction and y-direction position patterns, respectfully, for one of said intermediate sampling times;

determining intermediate current positions of said object in said x-direction and said y-direction by counting an encoded feedback signals from said X and Y servo motors, respectfully;

calculating x-direction and y-direction deviations in response to said intermediate current positions and said x-component and y-component positions;

calculating a x-direction transferring speed and a y-direction transferring speed for said one of said intermediate sampling times;

generating a digital x-direction transferring speed signal and a digital y-direction transferring speed signal;

converting said digital x-direction transferring speed signal and said digital y-direction transferring speed signal to respective analog representative signals and applying said analog representative signals to said X an Y servo motors, respectively for operably controlling said X and Y servo motors to transfer said object;

determining whether or not said final destination has been reached by said object; and stopping said X and Y servo motors if said final destination has been determined to have been reached or returning to said step of calculating x-component positions and y-component positions from said x-direction and y-direction position patterns, respectfully, and performing said steps for each of said intermediate sampling times until said final destination has been reached.

4. An apparatus for controlling X and Y servo motors for rectilinearly moving an object from an initial current position to a final destination position, said apparatus comprising:

means for generating a digital x-direction driving signal and a digital y-direction driving signal in response to a transferring speed signal;

first and second D/A converters for converting, respectively, said digital x-direction driving signal and said digital y-direction driving signal into an analog x-direction driving signal and an analog y-direction driving signal;

first and second means for detecting motor driving speeds of said X and Y servo motors, respectively, and for generating first and second speed feedback signals, said X and Y servo motors generating first and second current feedback signals;

first and second servo control means responsive to said analog x-direction and y-direction driving signals, said first and second speed feedback signals and said first and second current feedback signals, respectively, for respectively controlling said X and Y servo motors;

first and second encoders for detecting a current x position and y position of said object in response to output signals of said first and second means for detecting motor driving speeds, respectively; and first and second up/down counters for counting pulses output from said first and second encoders, respectively, for calculating current intermediate x and y positions of said object as the object is moved from said initial current position to said final destination position;

said generating means being responsive to said current intermediate x and y positions for generating said digital x-direction driving signal and said digital y-direction driving signal.

5. The apparatus as claimed in claim 4, wherein said generating means calculates x and y transferring distance in response to input x and y final destination coordinates and initial x and y current position coordinates, calculates a number of intermediate sampling times for use in determining intermediate destination positions over which said object is to be moved, calculates said intermediate destination positions for every intermediate sampling time, sets initial x and y position data equal to zero, calculates position patterns in a x-direction and a y-direction, calculates x-component positions and y-component positions from said x-direction and y-direction position patterns, respectively, for one of said sampling times, calculates x-direction and y-direction deviations in response to said current intermediate x and y positions and said x-component positions and y-component positions, calculates said digital x-direction driving signal and said digital y-direction driving signal for said one of said sampling times, determines whether said final destination position has been reached by said object, and stops said X and Y servo motors if said final destination position has been determined to have been reached and returns to said step of calculating x-component positions and y-component positions from said x-direction and y-direction position patterns, respectively, and performs each step thereafter for each of said sampling times until said final destination position has been reached.

6. An apparatus for controlling X and Y servo motors for rectilinearly moving an object from an initial current position to a final destination position, said apparatus comprising:

detecting means for generating first and second speed feedback signals respectively indicative of motor driving speeds of X and Y servo motors;

servo control means for controlling the X and Y servo motors in dependence upon first and second electrical currents respectively received from the X and Y servo motors, said x-direction and y-direction driving signals, and first and second speed feedback signals, and said first and second current feedback signals;

encoding means for providing output pulses indicative of current x-positions and current y-positions of the object in response to said first and second speed feedback signals;

counting means for providing intermediate x and y positions of the object as the object is moved form said initial current position to said final destination position, by counting said output pulses; and generating means for responding to a transfer speed signal by generating said x-direction driving signal and said y-direction driving signal in dependence upon said intermediate x and y positions.

7. The apparatus of claim 6, further comprised of generating means:

calculating x and y transfer distances in response to input x and y final destination coordinates and initial x and y current position coordinates;

calculating a number of intermediate sampling times for use in determining intermediate destination positions of the object;

calculating said intermediate destination positions for every intermediate sampling time;

setting initial x and y position data equal to a reference value;

calculating position patterns in an x-direction and a y-direction;

calculating x-component positions and y-component positions from said x-direction and y-direction position patterns respectfully, for one of said sampling times;

calculating x-direction and y-direction deviations in response to said current intermediate x and y positions and said x-component and y-component positions;

calculating said digital x-direction driving signal and said digital y-direction driving signal for said one of said sampling times;

determining whether said final destination position has been reached by said object; and stopping said X and Y servo motors if said final destination position has been determined to have been reached and returning to said step of calculating x-component positions and y-component positions from said x-direction and y-direction position patterns, respectively, and performing each step thereafter for each of said sampling times until said final destination position.

8. The apparatus of claim 6, further comprised of said generating means:

calculating each distance of the x-direction and y-direction from the initial position to the final destination over which the object is to be moved;

calculating distances of the object moved in the x-direction and y-direction and obtaining transfer speeds from the proportion of a vector sum corresponding to the calculated distances to distances assumed to be moved at previous stored average transferring speeds in corresponding x and y directions;

calculating proportions of moved distances to the transferring distances sampling time in x and y directions to obtain a number N of sampling time periods;

obtaining the transferring distances Sx(Ts) and Sy(Ts) in x and y directions and a previous stored transferring speed during said sampling times periods;

inserting the transferring distances Sx(Ts) and Sy(Ts) into position pattern equations with increases of k from 0 by 1 to obtain the position patterns for a plurality of the sampling time periods in X and Y coordinate axes, wherein, the position equations are as follows:

$$Px(k + 1) = Px(k) + \frac{Sx(Ts) - Px(k)}{J}$$

$$Py(k + 1) = Py(k) + \frac{Sy(Ts) - Py(k)}{J}$$

where:
Px(0)=Py(0)=0, and
k=an integer, accumulating values of the equations Px(k) and Py(k) corresponding to the arbitrary time k to obtain the total transferring distances of Px'(k) and Py'(k), wherein, the transferring distances Px(k) and Py(k), wherein, the transferring distances Px'(k) and Py'(k) are:

$$Px'(k) = \sum_{i=0}^{k} Px(i)$$

$$Py'(k) = \sum_{i=0}^{k} Py(i)$$

obtaining differences Epx(k) and Epy(k) of the transferred distances Px'(k) and Py'(k) at the arbitrary time k from current positions Cpx(k) and Cpy(k);

generating transfer speed commands Vcmx and Vcmy by multiplying the differences Epx(k) and Epy(k) by arbitrary coefficients Kpx and Kpy;

determining whether the object has reached the final destination position and stopping the servo motor if completing the transferring of the final destination;

performing again from the step of inserting the transferring distances Sx(Ts) and Sy(Ts) into position pattern equations with increases of k from 0 by increments of 1 to obtain the position patterns for a plurality of sampling time periods in X and Y axes if the object has not reached the final destination positions; and stopping the servo motor after completing the transfer of the object to the final destination.

9. The apparatus of claim 6, further comprised of said generating means:

calculating each distance of the x-direction and y-direction from the initial position to the final destination over which the object is to be moved;

calculating distances of the object moved in the x-direction and y-direction and obtaining transfer speeds from the proportion of a vector sum corresponding to the calculated distances to distances assumed to be moved at previous stored average transferring speeds in corresponding x and y directions;

calculating proportions of moved distances to the transferring distances sampling time in x and y directions to obtain a number N of sampling time periods;

obtaining the transferring distances Sx(Ts) and Sy(Ts) in x and y directions and a previous stored transferring speed during said sampling time periods;

inserting the transferring distances Sx(Ts) and Sy(Ts) into position pattern equations with increases of k from 0 by 1 to obtain the position patterns for a plurality of the sampling time periods in X and Y coordinate axes, wherein, the position pattern equations are as follows:

$$Px(k + 1) = Px(k) + \frac{Sx(Ts) - Px(k)}{J}$$

$$Py(k + 1) = Py(k) + \frac{Sy(Ts) - Py(k)}{J}$$

where:
Px(0)=Py(0)=0, and
k=an integer, accumulating values of the equations Px(k) and Py(k) corresponding to the arbitrary time k to obtain the total transferring distance of Px'(k) and Py'(k), wherein, the transferring distances Px'(k) and Py'(k), wherein, the transferring distances Px'(k) and Py'(k) are:

$$Px'(k) = \sum_{i=0}^{k} Px(i)$$

-continued $$Py'(k) = \sum_{i=0}^{k} Py(i)$$

obtaining differences Epx(k) and Epy(k) of the transferred distances Px'(k) and Py'(k) at the arbitrary time k from current positions Cpx(k) and Cpy(k); and generating transfer speed commands Vcmx and Vcmy by multiplying the differences Epx(k) and Epy(k) by arbitrary coefficients Kpx and Kpy.

* * * * *

UNITED STATES PATENT AND TRADEMARK OFFICE
CERTIFICATE OF CORRECTION

PATENT NO. : 5,142,207
DATED : 25 August 1992
INVENTOR(S) : Sung-Wook SUH It is certified that error appears in the above-identified patent and that said Letters Patent is hereby corrected as shown below:

Claim 1,  Column 7,  Line 27,  insert a comma --,-- after "destination";

Column 7,  Line 46,  change "the" to --an--; and

Column 7,  Line 49,  change "equation" to --equations--.

Claim 3,  Column 8,  Line 48,  change "a" to --an--; and

Column 8,  Line 56,  change "a" (first occurrence) to --an--.

Claim 4,  Column 9,  Line 51,  delete "and"; and
Column 9,  Line 57,  insert --and-- after the semicolon";".

Signed and Sealed this

Fifth Day of April, 1994

Attest:

BRUCE LEHMAN

*Attesting Officer*   Commissioner of Patents and Trademarks